United States Patent [19]

McGary et al.

[11] Patent Number: 5,774,316

[45] Date of Patent: Jun. 30, 1998

[54] GROUND FAULT DETECTOR FOR LINE-POWERED TELEPHONE NETWORK

[75] Inventors: John S. McGary; Barry C. Zitting, both of Huntsville; Steven M. Robinson, Madison, all of Ala.

[73] Assignee: Adtran, Inc., Huntsville, Ala.

[21] Appl. No.: 704,464

[22] Filed: Aug. 26, 1996

[51] Int. Cl.$^6$ .................................................. H02H 3/00
[52] U.S. Cl. ............................................ 361/42; 361/101
[58] Field of Search .............................. 361/42, 47–50, 361/93, 100, 101, 119

[56] References Cited

U.S. PATENT DOCUMENTS

| | | | |
|---|---|---|---|
| 4,410,925 | 10/1983 | Tucker et al. | 361/42 |
| 4,571,460 | 2/1986 | Rosenbaum et al. | 179/16 |
| 4,679,111 | 7/1987 | Koch et al. | 361/42 |
| 4,739,274 | 4/1988 | Kimball et al. | 324/529 |
| 4,739,275 | 4/1988 | Kimball et al. | 324/529 |
| 4,929,901 | 5/1990 | Kimball et al. | 324/529 |
| 4,969,062 | 11/1990 | Barylak et al. | 361/42 |

Primary Examiner—Jeffrey A. Gaffin
Assistant Examiner—Sally C. Medley
Attorney, Agent, or Firm—Charles E. Wands

[57] ABSTRACT

A ground fault detection and line power supply control system protects telecommunication service personnel working on line-powered telephone circuits from ground faults, without requiring that the line power supply be disconnected or shut down prior to a technician working on the line. A ground fault loop sensing current is sourced from an auxiliary DC voltage source that is separate and distinct from the line power supply. This auxiliary DC voltage source is coupled through a ground fault current sense resistor to one side of the powered line, so that detection of a ground fault condition is not dependent upon the supply of current from the potentially hazardous line supply. If a ground fault occurs through either or both of the powered lines, the current flow through the sense resistor will exceed a prescribed threshold, and initiate operation of a switching circuit within the line-powering equipment, thereby rapidly reducing power to the telephone line until the ground fault is cleared or the loop power supply is reset.

30 Claims, 6 Drawing Sheets

GROUND FAULT DETECTOR FOR LINE-POWERED TELEPHONE NETWORK

FIELD OF THE INVENTION

The present invention relates in general to communication systems and is particularly directed to a method and apparatus for controllably reducing power supplied over a line-powered telephone loop to one or more communication circuits to a safe level, in the event either or both wires of the line-powered loop inadvertently become coupled to a ground fault condition.

BACKGROUND OF THE INVENTION

In addition to transporting audio (voice), video and/or data signals over (copper wire) telephone lines, certain types of telecommunication equipment employ the same conductive pair to remotely power one or more circuits, such as midspan repeaters and terminating devices, that are connected across the line pair. This method of remote line powering is commonly termed 'loop powering' and is used extensively in DDS, ISDN, T1 and HDSL networks. The line-powering source is customarily located within a phone company equipment bay, where DC powering voltages are combined with the telecommunications signals that are conveyed over the copper line pair to customer circuits. Since, however, much of the loop-powered equipment is located in cramped and wet spaces, such as manholes, personnel servicing the network may be exposed to potentially dangerous working conditions.

In order to protect service personnel from the dangers of such conditions, the industry has established limits on the working voltage and (ground) fault currents that are allowed on line-powered equipment. Namely, as long as the voltage and current parameters are maintained below harmful limits, service personnel are permitted to perform their tasks without having to first shut off the line power source. However, when the voltage and current parameters exceed such limits, the power source must be shut down at the phone company before servicing the network. It will be readily appreciated therefore that there is great advantage, from both safety and economic considerations, in being able to safely work on remote equipment without having to shut off the power source in the phone company facility.

A further problem is the fact that continued improvements in telecommunication circuits and signal processing techniques have made it possible to substantially increase the length of phone lines without the costly exercise of installing a repeater. However, since these increased phone lines lengths are necessarily accompanied by an inherent increase in their effective conductor resistance, it is necessary to boost the line-powering voltage generated in the equipment bay in order to overcome the elevated loop resistance. Further, as the sophistication of the signal processing circuitry of the remote equipment has increased, so too have their power requirements. Thus, the combination of longer phone lines and higher power requirements of the loop equipment makes protection of service personnel difficult when the loop is remotely powered.

Figure 1:
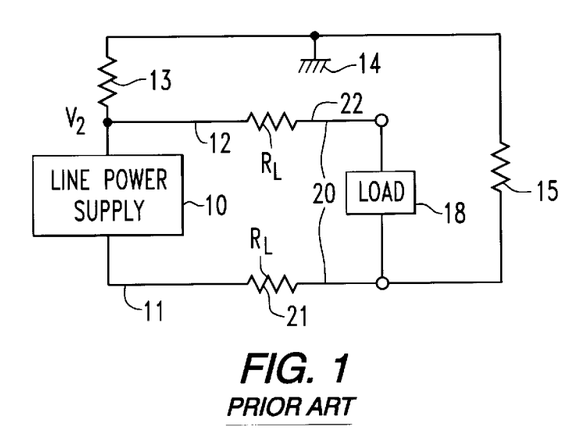
FIG. 1 diagrammatically illustrates a conventional isolation impedance-based mechanism for providing a powered telephone line with protection against ground faults.

A conventional mechanism of providing a powered telephone line with protection against ground faults is diagrammatically illustrated in FIG. 1 as comprising a relative high valued, ground fault isolation impedance 13 (typically on the order of 40–100 KΩ) coupled between the low voltage side 12 of a line power supply 10 and an earth ground terminal 14. The line (span) power supply 10 has respective high and low voltage output terminals 11 and 12, which provide a differential voltage (e.g., on the order of 190 volts) across respective wires 21 and 22 shown as equivalent line impedances $R_L$ of a powered telephone line pair 20, and providing power to one or more telephone circuits, shown as a load 18.

With this configuration, should maintenance personnel (connected to earth ground 14) inadvertently contact the high voltage side 11 of the power supply (forming a ground fault connection to the line power supply represented by a ground fault impedance 15), the high valued protection impedance will be part of the return loop between the ground fault (service technician) and the low voltage side 12 of the line power supply 10, thereby protecting the individual from the line power voltage. However, if the ground fault is formed between the low voltage side 12 of the line power supply and earth ground 14, the isolation impedance 13 will be effectively by-passed, thereby placing the craftsperson in the line power supply's current flow loop without the benefit of the electrical hazard protection intended by isolation impedance 13. In other words, the use of a conventional isolation impedance is effective as long as the isolation impedance is maintained; however, if the isolation impedance becomes by-passed, service personnel are no longer protected. To be on the safe side, therefore, it behooves a craftsperson to disconnect the power supply 10 before servicing the line.

SUMMARY OF THE INVENTION

Pursuant to the invention, the above-described need to protect service personnel working on line-powered telephone circuits from the potential hazard of ground faults is successfully addressed by a new and improved ground fault detection and power control system that does not require that the line power supply be disconnected prior to working on the line. The invention employs a relatively low magnitude ground fault loop current-source, in the form of an auxiliary DC voltage source and an associated ground fault sense resistor coupled in circuit with the power-transporting telephone line pair. A ground fault-sensing comparator circuit measures the current flow through the sense resistor. Should a ground fault condition be initiated by either or both of the conductive links of the power-transporting pair becoming inadvertently coupled to earth ground, the current flow through the sense resistor will exceed a prescribed 'ground fault' threshold. In response to this threshold being exceeded, the ground fault-sensing comparator operates a switching circuit within the line-powering equipment, so as to interrupt or rapidly reduce power to the telephone line to a safe level, until the ground fault is cleared or the line power supply is reset.

In accordance with a preferred, but non-limiting embodiment of the invention, the auxiliary DC voltage source may comprise an isolated secondary transformer winding of a DC-DC converter, that includes a diode rectifier filter coupled in series across the transformer winding and referenced to frame ground. This auxiliary DC voltage source provides power for the ground fault-sensing comparator and a ground reference for the line power supply through a ground fault current sense resistor. The ground fault-sensing comparator includes a shunt regulator connected in circuit with an optical coupler in the control path of a pulse width modulation (PWM) control circuit of a flyback DC-DC converter of the line power supply. This PWM control circuit is coupled with an FET switch and a primary winding of an output voltage transformer. The output transformer has a secondary winding coupled through an output rectifier and an LC filter circuit to the powered telephone line pair.

The shunt regulator has its control input coupled to a noise-reduction resistor—capacitor filter, which is operative to suppress ambient noise, while maintaining adequate response time for ground fault conditions. A voltage divider scales a fault voltage derived across the ground fault sense resistor and provides for adjustment of the ground fault sensing current and the value of the sense resistor for optimum performance. Absent the creation of a substantial leakage path to ground, the magnitude of the sense current Is flowing through sense resistor will remain below the ground fault detection threshold. However, in the event of a ground fault condition, the magnitude of the sense current will exceed the threshold, causing the comparator to supply an output signal to opto-coupler shutting down the PWM control circuit of the flyback DC-DC converter, thereby rapidly reducing the line supply voltage and providing protection to service personnel.

Pursuant to a first modification of the invention, a solid state relay is coupled in shunt with the powered telephone line pair, in order to rapidly discharge the output LC filter circuit of the flyback DC-DC converter. In this modified embodiment, the opto-coupler is employed as a secondary control mechanism to maintain fault current levels. Pursuant to a further modification, the solid state relay is replaced by a solid state latch (triac). In this 'crowbar' latched protection embodiment, the optical signal based triac shuts down the line power supply by rapidly discharging the line power supply's output filter and places the line power supply in a short circuit, current-limiting condition. Regardless of the ground fault condition, the line power supply will remain clamped in this short circuit condition, until it is reset or power is momentarily interrupted.

DETAILED DESCRIPTION

Before describing in detail the new and improved ground fault detection and power control system in accordance with the present invention, it should be observed that the invention resides primarily in what is effectively a prescribed arrangement of conventional communication circuits and components. Thus, the configuration of such circuits and components and the manner in which they are interfaced with other communication system equipment have, for the most part, been illustrated in the drawings in readily understandable block diagram format, so as to show only those specific details that are pertinent to the present invention, and not to obscure the disclosure with details which will be readily apparent to those skilled in the art having the benefit of the description herein, and are primarily intended to show the major components of the system in a convenient functional grouping, so that the present invention may be more readily understood.

Figure 2:
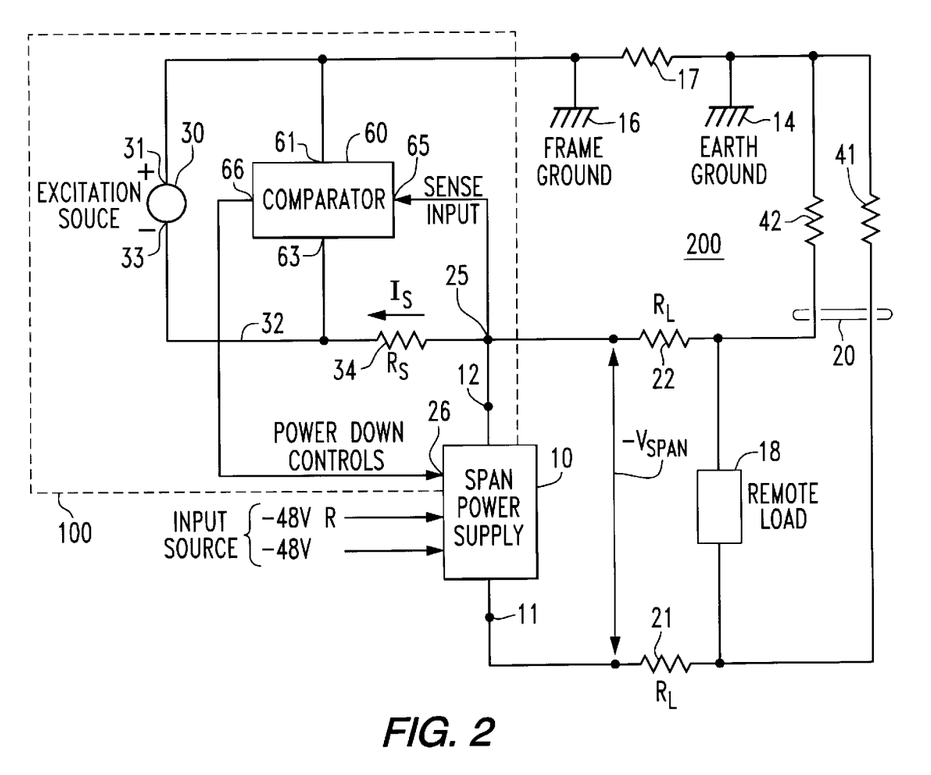
FIG. 2 diagrammatically illustrates a ground fault detection and line-powering control system in accordance with the present invention.

Referring now to FIG. 2, the ground fault detection and line-powering control system in accordance with the present invention is diagrammatically shown at 100 as comprising an electrical stimulus generator 30, in the form of a DC voltage source, which is coupled through an auxiliary conductive path 32 to the two-wire conductive telephone line pair 20 of which the network portion 200 of the system is comprised. For supplying electrical power to the telephone line pair 20, the network 200 includes a line power supply 10, which is coupled to an external (−48V) power source (not shown). Line power supply 10 has respective high (190V) and low (0V) output terminals 11 and 12, which are coupled to respective portions 21 and 22 of telephone line pair 20, as described above with reference to the standard line-powered network configuration of FIG. 1.

In FIG. 2, the respective portions 21 and 22 of telephone line pair 20 are represented by equivalent line resistances $R_L$. Whatever remote circuit equipment (such as a network terminating unit, repeater, etc.) is coupled across the network pair 20 is again diagrammatically represented by load impedance 18. As pointed out above, if a ground fault occurs, it may result from either the low voltage side 22 of the line and/or the high voltage side 21 of the conductive (metallic) line pair 20 being inadvertently coupled to earth ground 14. A ground fault on the high voltage side 21 is shown as a ground fault resistance 41 coupled to earth ground. A ground fault on the low voltage side 22 is shown as a ground fault resistance 42 being coupled to earth ground.

In accordance with the present invention, the ground fault detection and power control system 100 includes a ground fault sensor in the form of a comparator 60, which is coupled in circuit with the auxiliary conductive path 32 and the DC voltage generator 30. In particular, comparator 60 includes a pair of power input terminals 61 and 63 coupled to respective DC voltage output terminals 31 and 33 of DC voltage generator 30. Terminals 31 and 61 are further coupled to an equipment frame ground 16. Any difference between equipment frame ground 16 and earth ground 14 is represented by a resistance 17 therebetween.

Ground fault sensing comparator 60 further includes a sense input 65 coupled to a sense node 25 of the telephone line pair 20. In the illustrated embodiment, sense node 25 is coupled to the low voltage side 22 of the telephone line pair 20. Comparator 60 also has a control output port 66 coupled to an switch control input 26 of line power supply 10. As will be described, comparator 60 is operative to monitor current flow through an auxiliary path impedance 34, which is installed in the auxiliary conductive path 32 between node 25 and the low voltage terminal 12 of DC voltage generator 10.

Figure 5:
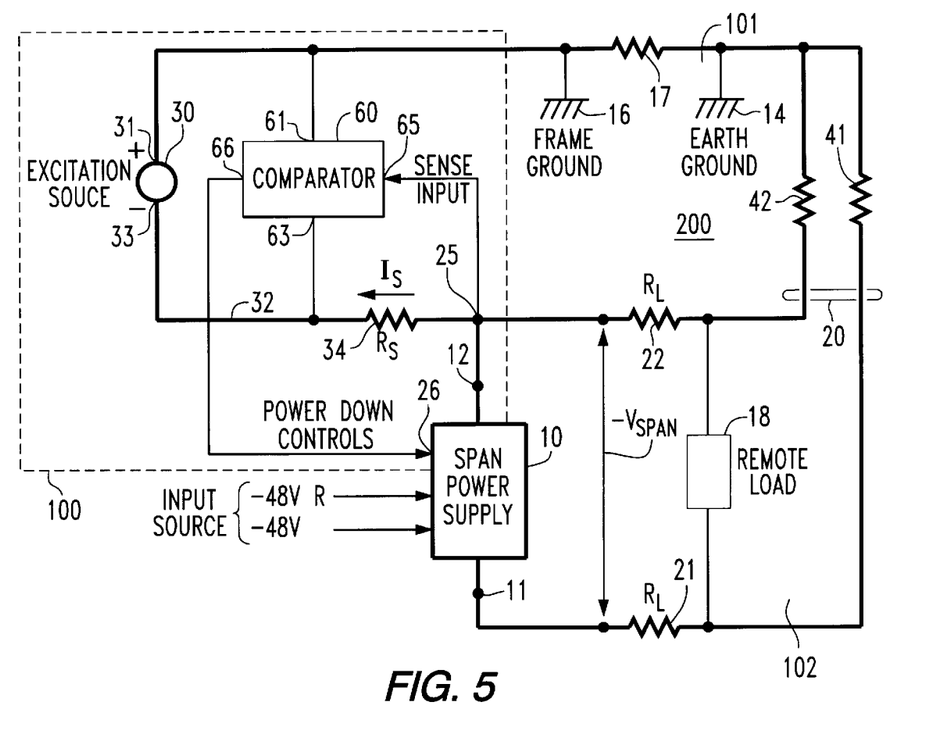
FIG. 5 diagrammatically illustrates combined low and high voltage side ground fault current flow paths through the ground fault detection and line-powering control system of FIG. 2.

For this purpose, comparator 60 includes a current threshold detection circuit (to be described with reference to FIG.

5) which monitors the voltage across auxiliary conductive path impedance 34 for the presence of a current flow therethrough in excess of a prescribed threshold associated with a ground fault condition. In response to current flow through the auxiliary conductive path impedance 34 exceeding this prescribed threshold, the control output port 66 of comparator circuit 60 and thereby the control input 26 of line power supply 10 changes state, so as to controllably cause the magnitude of the supply line voltage to the telephone line pair 20 by power supply 10 to be rapidly reduced to a safe level.

In operation, one or more ground fault detection loops are formed when any of three ground fault conditions occurs: 1) the high voltage side 21 is connected to earth ground 14; 2) the low voltage side 22 is connected to earth ground 14; and 3) both the high voltage side 21 and the low voltage side 22 become connected to earth ground 14.

Figure 3:
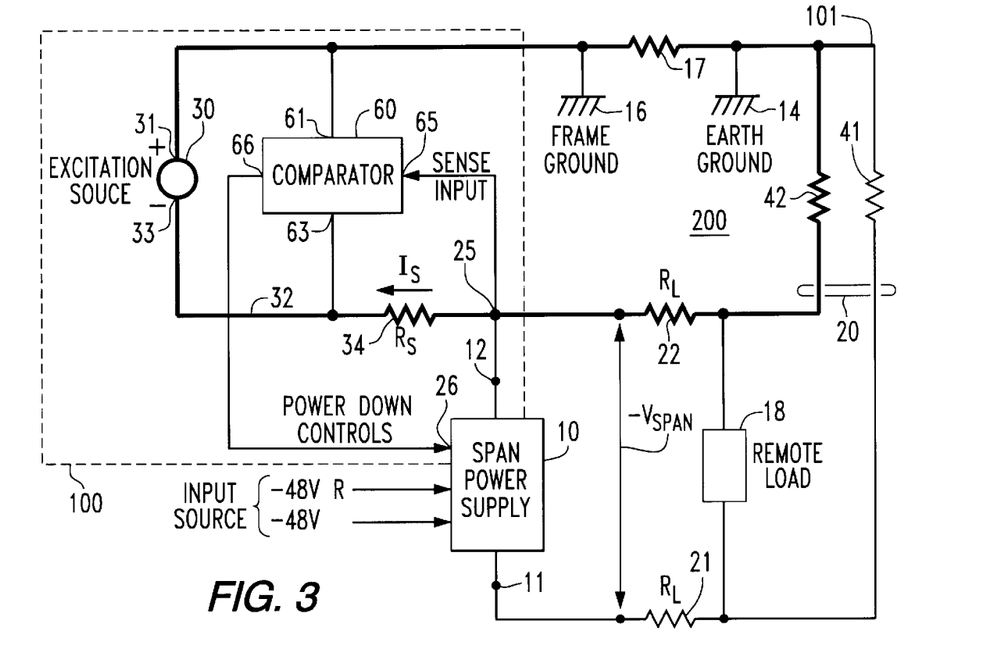
FIG. 3 diagrammatically illustrates a low voltage side ground fault current flow path through the ground fault detection and line-powering control system of FIG. 2.

The ground fault detection path for the low voltage side 22 is diagrammatically illustrated in FIG. 3 as having a principal sense current loop 101 (shown in bold), and including DC voltage source 30, ground fault sense resistor 34, low side loop resistor 24, ground fault impedance 42 and resistance 17. With (sense) loop current Is flowing through the loop 101, a ground fault sense voltage Vs is developed across sense resistance 34. This ground fault sense voltage is compared in comparator 60 with a prescribed ground fault threshold voltage. When this voltage exceeds a ground fault associated reference voltage, the output of comparator 60 at port 66 changes state, providing a power shut-down control signal to line power supply 10. This control signal causes power supply 10 to rapidly reduce its output voltage to zero (e.g., within a few milliseconds), so that the voltage imparted to the telephone line pair 20 is substantially impacted (the normal application of a high voltage to the high side of the telephone line is impaired), thereby preventing the application of a potentially hazardous voltage to service personnel.

As long as the low side ground fault persists, comparator 60 will continue to detect that the sense current Is exceeds the threshold, and maintain the output of power supply 10 at a very reduced (e.g., null) level that is not hazardous to service personnel. When the low side ground fault is removed, the level of sense current Is will drop below the ground fault threshold, and the output of comparator 60 will change state, restoring the outputs of the line voltage supply 10 to their previous line-powering voltage levels.

Figure 4:
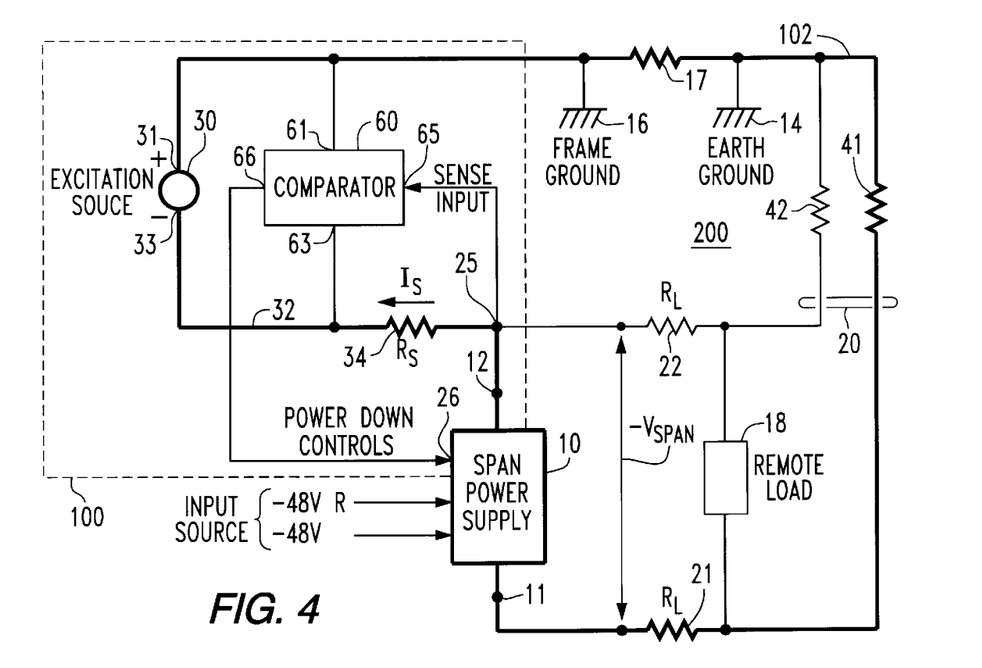
FIG. 4 diagrammatically illustrates a high voltage side ground fault current flow path through the ground fault detection and line-powering control system of FIG. 2.

FIG. 4 illustrates the current flow path associated with a high voltage side ground fault. As shown therein, the ground fault detection path for the high voltage side 21 of the powered line pair 20 has a sense current loop 102 shown in bold as including the DC voltage excitation source 30, ground fault sense resistor 34, line power supply 10, high side loop resistor 23, ground fault impedance 41 and resistance 17. With (sense) loop current Is flowing through the loop shown 102, a ground fault sense voltage Vs is again developed across sense resistance 34, which is compared in comparator 60 with the prescribed ground fault threshold voltage. When this voltage exceeds a ground fault associated reference voltage, the output of comparator 60 at port 66 changes state, providing a power shut-down input to line power supply 30, thereby reducing the application of potentially hazardous voltages to the telephone line pair 20 by power supply 10. In this state, the major component of the sense current is produced by the line supply 10. As the line supply is throttled back by the comparator, loop sense current Is continues to be supplied by the combination of the excitation DC voltage source 30 and line power supply 10, so as to keep the line power output at a relative safe level. Once the high side ground fault is removed, the sense current level will drop below the ground fault threshold, and the output of comparator 60 will change state, restoring the outputs of the line voltage supply 10 to their previous line-powering voltage levels.

Thus, for both the low and high side ground fault loops of FIGS. 3 and 4, the sense current Is is essentially the current flowing through the ground fault impedance (42 or 41). The principal difference between the two types of faults is the fact that the loop current for a low side ground fault (FIG. 3) is sourced from the DC voltage source 30, whereas the loop current for a high side ground fault (FIG. 4) is sourced primarily from the line power supply 10.

In the case of simultaneous low side and high side ground faults illustrated in FIG. 5, two fault loops 101 and 102 are formed. The sense current Is is thus the combined fault currents IF1 flowing in the low side loop 101 and IF2 flowing in the high side loop 122. Since the combined fault currents IF1 and IF2 will always be less than the allowable fault current through one of the fault impedances (41/42), protection is maintained for all combinations of fault conditions.

Figure 6:
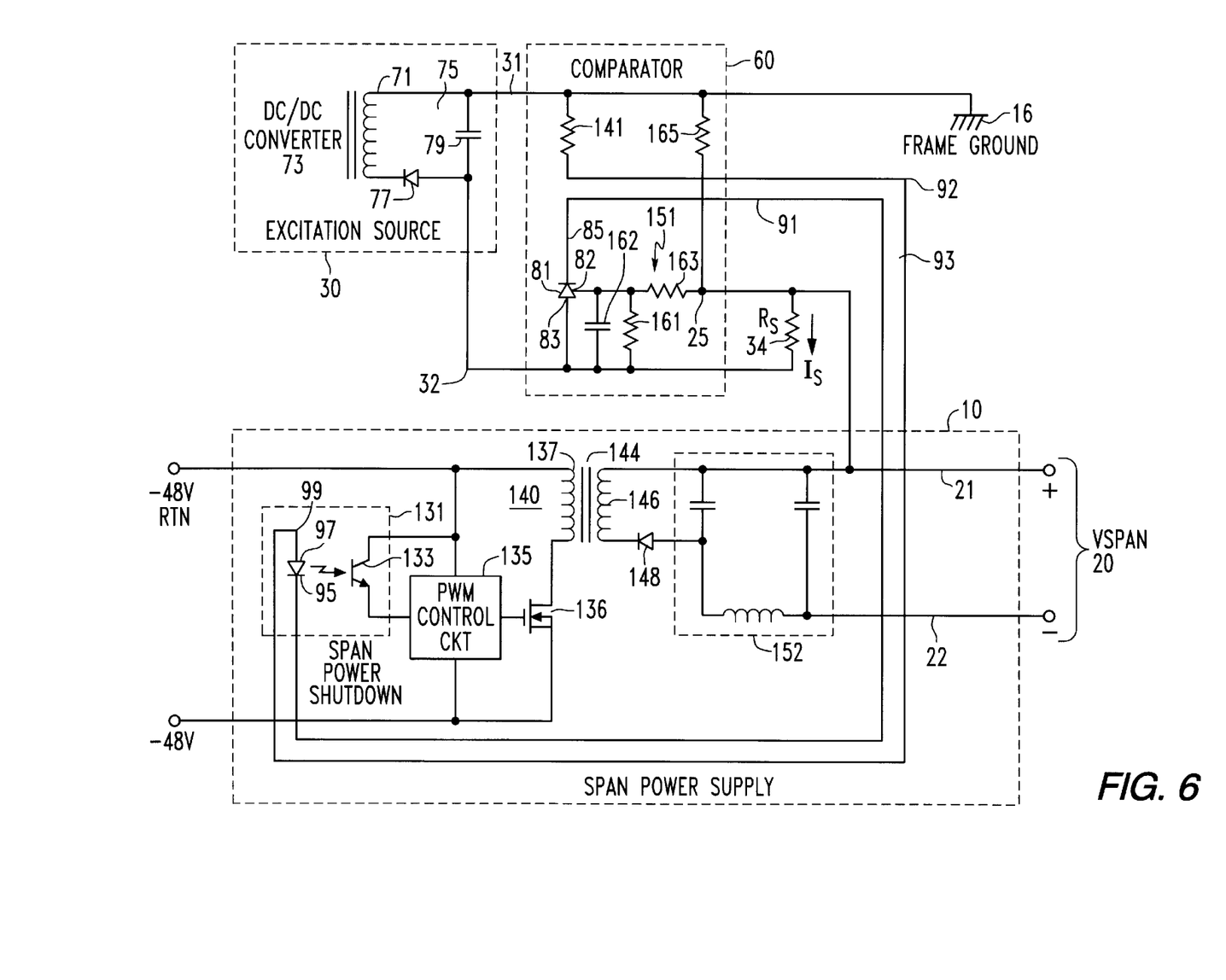
FIG. 6 shows circuitry for implementing the ground fault detection and line-powering control system of FIG. 2.

FIG. 6 shows the details of circuitry that may be employed for implementing the ground fault detection and line-powering control system of the present invention diagrammatically illustrated in FIG. 2. As shown therein, excitation DC voltage source 30 comprises an isolated secondary transformer winding 71 of a DC-DC converter 73 and a simple rectifier filter circuit 75 formed of rectifier 77 and capacitor 79 coupled in series across winding 71, and referenced to frame ground 16. The output of DC voltage source 30 on lines 31 and 32 provides power for the comparator 60 and a ground reference for the line power supply 10 through sense resistor 34.

Comparator 60 includes a shunt regulator 81, having its anode 83 coupled to line 32 and its cathode 85 coupled to a first line 91 of an output control link 93. Output control link 93 is coupled to the cathode 95 of a light emitting diode (LED) 97 of an optical coupler 131. LED 97 has its anode 99 coupled via line 92 of control link 93 through a resistor 141 to line 31. The light emitted by LED 97 is sensed by an opto-sensing transistor 133, which is coupled in the control circuit path of a pulse width modulation (PWM) control circuit 135 of a flyback DC-DC converter 140. PWM control circuit 135 is coupled in circuit with an FET switch 136 and a primary winding 137 of an output voltage transformer 144. Output transformer 144 has a secondary winding 146 coupled in circuit with an output rectifier 148 and LC filter circuit 152 to the high voltage side 21 and the low voltage side 22 of line pair 20.

Shunt regulator 81 has its control input 82 coupled to a noise reduction filter 151 comprised of parallel-connected resistor 161 and capacitor 162, which are coupled across the control input 82 and anode 83 of shunt regulator 81, a resistor 163, which is coupled between the control input 82 and sense node 25, and a resistor 165, which is coupled between sense node 25 and line 31. Noise reduction filter 151 has a single pole cutoff established by capacitor 162 and the equivalent resistance of resistor 161 and resistor 163. The filter cutoff frequency is defined to suppress ambient noise, while maintaining adequate response time for ground fault conditions. Resistor 165 forms a voltage divider with sense resistor 34, so as to scale the fault voltage and provide for adjustment of the sense current Is and the value of the sense resistor 34 for optimum performance. When the scaled voltage developed across the sense resistor 34 exceeds the input threshold of shunt regulator 81, optical coupler 131 is energized and shuts down the PWM control circuit 135 of the flyback DC-DC converter 140.

It will be readily appreciated that an essential feature of the line power supply 10 is its ability to be shut down by means of the external control signal supplied by way of the opto-coupler 131 at the output of the comparator 60. As pointed out above, so long as the line power supply 10 has no substantial leakage path to ground (a ground fault), the magnitude of the sense current Is flowing through sense resistor 34 will remain below the ground fault detection threshold. However, in the event of any of the three ground fault conditions described above, causing the magnitude of the sense current Is to exceed the threshold, the comparator 60 will provide an output signal to opto-coupler 131 and substantially shut down the line power supply 10, as described previously with reference to FIGS. 3, 4 and 5.

Figure 7:
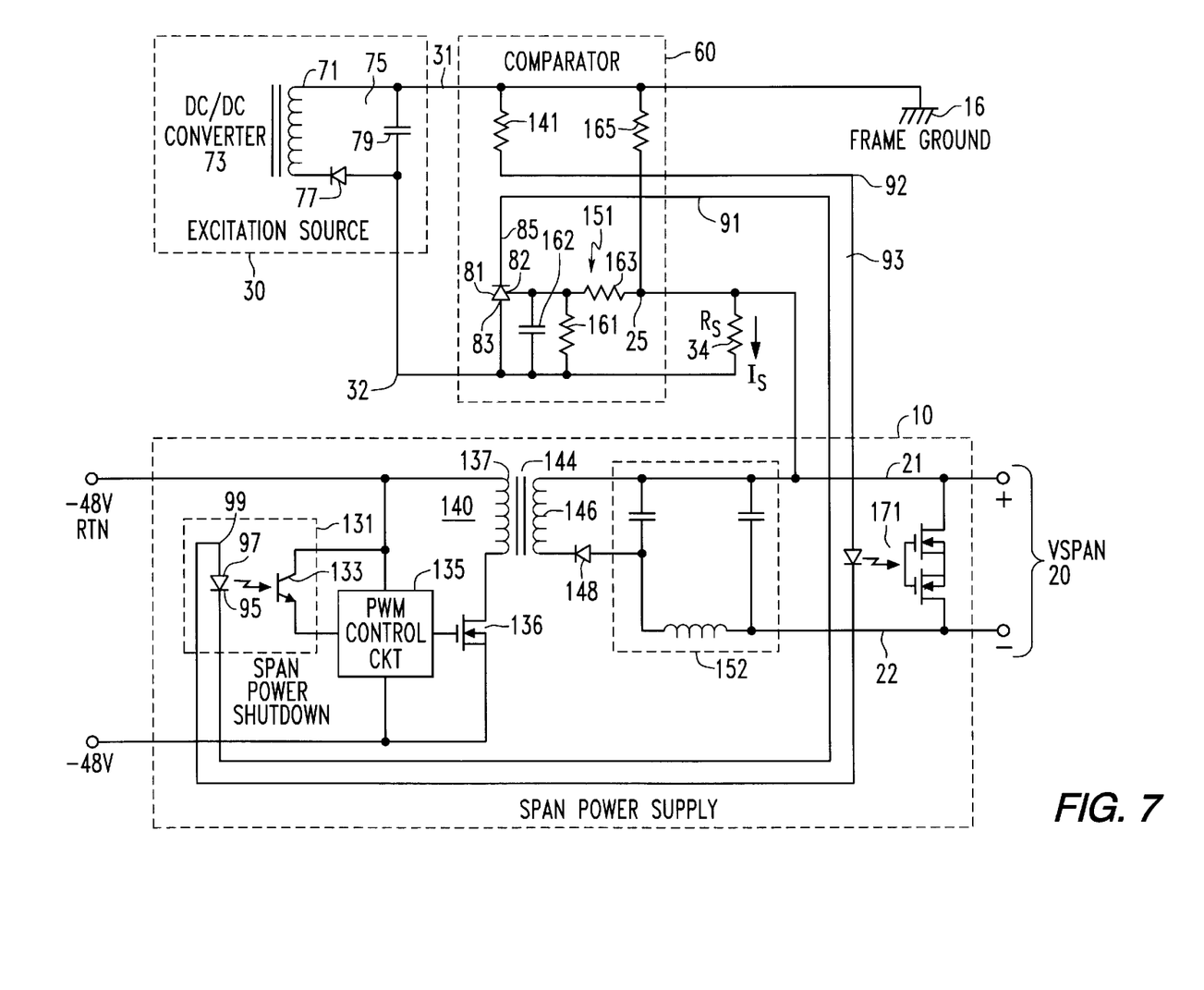
FIG. 7 shows a modification of the circuitry implementation of FIG. 6, in which a solid state relay is coupled in shunt with the powered telephone lines in order to rapidly discharge the output filter circuit of a power supply's flyback DC-DC converter.

FIG. 7 shows a modification of the circuitry implementation of FIG. 6, in which a solid state relay 171, shown as an opto-coupled FET switch, is coupled in shunt with lines 21 and 22, in order to rapidly discharge the output LC filter circuit 152 of the flyback DC-DC converter 140. In this modified embodiment, the opto-coupler is employed as a secondary control mechanism to maintain fault current levels.

Figure 8:
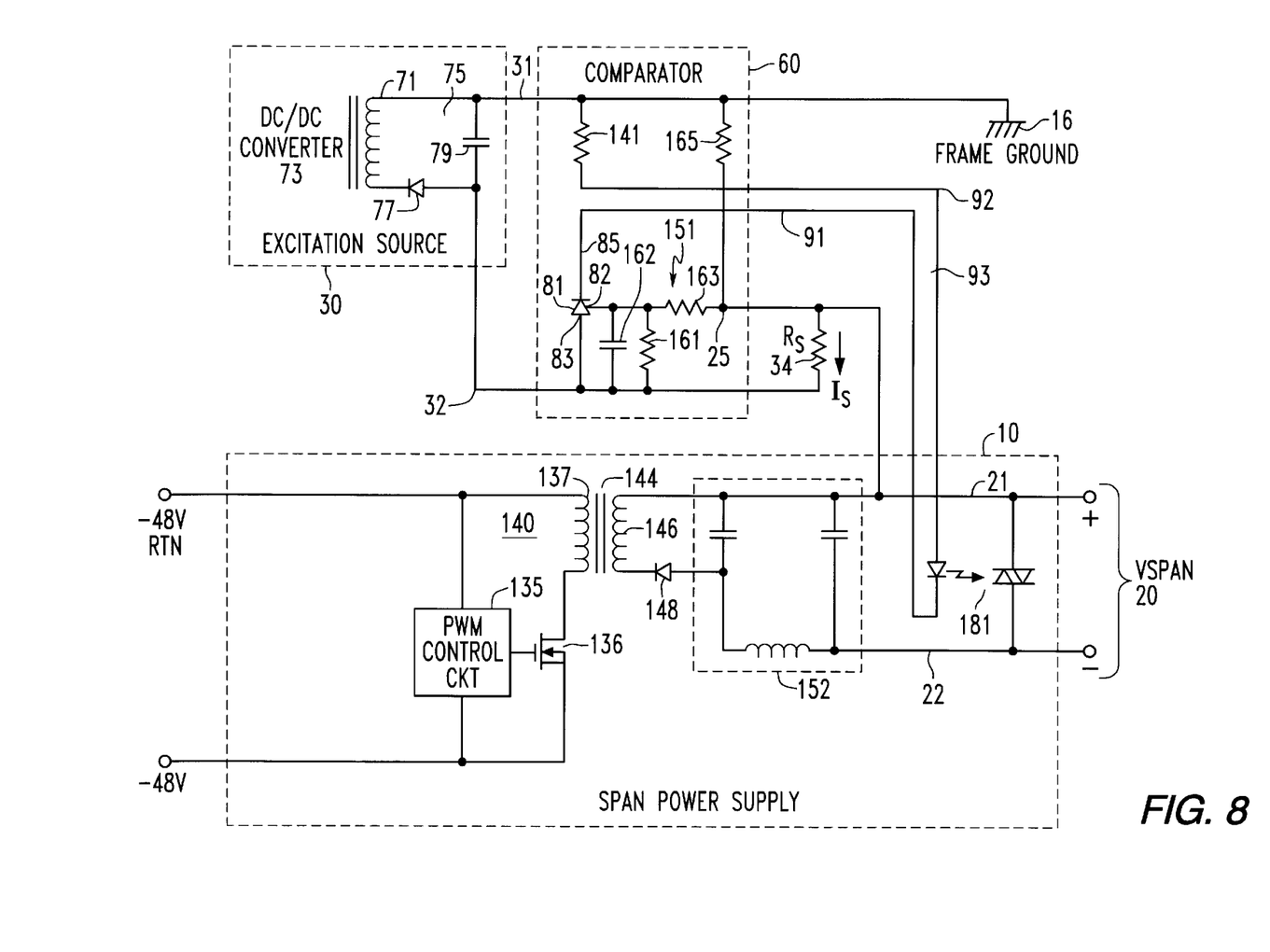
FIG. 8 shows a modification of the circuitry implementation of FIG. 7, in which the solid state relay of FIG. 7 is replaced by a solid state latch (triac) coupled in shunt with the powered telephone lines.

FIG. 8 shows a modification of the circuitry implementation of FIG. 7, in which the solid state (FET) relay 171 is replaced by an opto-coupled solid state latch (triac) 181 coupled in shunt with lines 21 and 22. In this latched protection embodiment, the optical signal based triac 181 shuts down the line power supply 10 by rapidly discharging the line power supply's output filter 152 and places the line power supply in a short circuit current limit typical of crowbar protection. The line power supply 10 will remain clamped in this short circuit condition, until it is either reset or power is momentarily interrupted, regardless of the state of the ground fault condition.

As will be appreciated from the foregoing description, the above-described need to protect telecommunication service personnel working on line-powered telephone circuits from ground faults, without having to first disconnect the power source prior to working on the line, is successfully addressed by the ground fault detection and power control system of the present invention, which employs a reduced magnitude ground fault loop current excitation source. By implementing this excitation source as an auxiliary voltage source that is separate and distinct from the line power supply for the telephone line pair, detection of a ground fault condition is not dependent upon the supply of current from the potentially hazardous line supply.

A ground fault-sensing comparator circuit is coupled to monitor current flowing through a ground fault-sensing impedance installed in circuit with the telephone line. The occurrence of a ground fault condition—involving connecting either or both of the powered lines of the power-transporting pair to ground—will cause the reduced value of sense current flow through the auxiliary impedance to exceed a prescribed ground fault threshold, and initiate operation of a switching circuit within the line-powering equipment, thereby impairing the application of power to the telephone line until the ground fault is cleared or the power supply is reset.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a communications network having a conductive link which conveys telecommunication signals and power for one or more communication circuits coupled to said conductive link, a method of controllably reducing the application of power to said conductive link in the event of a person forming a ground fault by being coupled between said conductive link and a ground reference comprising the steps of:

(a) applying a prescribed electrical stimulus to an auxiliary conductive path coupled to said conductive link;

(b) monitoring said auxiliary conductive path for an indication of the occurrence of said ground fault in said conductive link; and (c) in response to said occurrence of a ground fault, protecting said person from an electrical hazard by substantially reducing power applied to said conductive link.

2. A method according to claim 1, wherein step (b) comprises monitoring said auxiliary conductive path for the presence of a current in excess of a prescribed threshold, and wherein step (c) comprises, in response to said current through said auxiliary conductive path exceeding said prescribed threshold, rapidly reducing power to said conductive link.

3. A method according to claim 1, further including the step (d) of, in response to termination of said ground fault, recoupling power to said conductive link.

4. A method according to claim 1, wherein said conductive link comprises a telephone network conductive pair having a first conductive line to which a first side of a line power supply is coupled and a second conductive line to which a second side of said line power supply is coupled, said line power supply being operative to apply a line-powering voltage across said first and second conductive lines, and wherein step (a) comprises applying said prescribed electrical stimulus through an auxiliary conductive path to one of said first and second conductive lines.

5. A method according to claim 4, wherein step (a) comprises applying said prescribed excitation stimulus as a prescribed excitation voltage between said one of said first and second conductive lines and a first reference potential terminal, step (b) comprises monitoring said auxiliary conductive path for the presence of a current in excess of a prescribed threshold, and step (c) comprises, in response to said current through auxiliary conductive path exceeding said prescribed threshold, controlling the operation of said line power supply to rapidly shut down the magnitude of said line-powering voltage being applied across said first and second conductive lines.

6. A method according to claim 5, wherein said prescribed excitation voltage is a DC voltage.

7. A method according to claim 5, wherein step (a) comprises applying said prescribed excitation voltage between said one of said first and second conductive lines and a ground reference potential terminal.

8. A method according to claim 7, wherein step (a) comprises applying said prescribed excitation voltage between said ground reference potential terminal and that one of said one of said first and second conductive lines to which a relatively high voltage side of said line-powering voltage is applied.

9. A method according to claim 7, wherein step (c) comprises controlling the operation of said line power supply by means of an electro-optic control device.

10. A method according to claim 7, wherein step (c) comprises placing a short circuit clamp condition across said first and second conductive lines, in response to said current through auxiliary conductive path exceeding said prescribed threshold.

11. A method according to claim 7, wherein step (c) comprises latching a short circuit clamp condition across said first and second conductive lines, in response to said current through auxiliary conductive path exceeding said prescribed threshold.

12. A ground fault detection and power control system for a communications network having a conductive link for transporting telecommunication signals and power for one or more communication circuits coupled to said conductive link, comprising:

an electrical excitation source coupled through an auxiliary conductive path coupled to said conductive link; and a ground fault sensor coupled in circuit with said auxiliary conductive path for monitoring said auxiliary path for a prescribed change in an electrical characteristic thereof representative of a person forming a ground fault with said conductive link by being coupled between said conductive link and a ground reference and, in response to said ground fault, being operative to protect said person from an electrical hazard by substantially reducing power applied to said conductive link.

13. A ground fault detection and power control system according to claim 12, wherein said ground fault sensor includes a current threshold comparator which is operative to monitor said auxiliary conductive path for the presence of a current in excess of a prescribed threshold and, in response to said current through auxiliary conductive path exceeding said prescribed threshold, causing power applied to said conductive link to be rapidly reduced to a non-hazardous level.

14. A ground fault detection and power control system according to claim 12, wherein said ground fault sensor is operative, in response to termination of said ground fault, to cause power to be restored to said conductive link.

15. A ground fault detection and power control system according to claim 12, wherein said conductive link comprises a telephone network conductive line pair having a first conductive line to which a first side of a line power supply is coupled and a second conductive line to which a second side of said line power supply is coupled, said line power supply being operative to apply a line-powering voltage across said first and second conductive lines, and wherein said electrical excitation source is operative to apply a prescribed electrical stimulus through an auxiliary conductive path to one of said first and second conductive lines.

16. A ground fault detection and power control system according to claim 15, wherein said electrical excitation source is operative to apply a prescribed excitation voltage between said one of said first and second conductive lines and a first reference potential terminal, and wherein said ground fault sensor is operative to monitor said auxiliary conductive path for the presence of a current in excess of a prescribed threshold and, in response to said current through auxiliary conductive path exceeding said prescribed threshold, to control the operation of said line power supply to rapidly reduce said line-powering voltage applied across said first and second conductive lines.

17. A ground fault detection and power control system according to claim 16, wherein said prescribed excitation voltage is a DC voltage.

18. A ground fault detection and power control system according to claim 16, wherein said electrical excitation source is operative to apply said prescribed excitation voltage between said one of said first and second conductive lines and a ground reference potential terminal.

19. A ground fault detection and power control system according to claim 16, wherein said electrical excitation source is operative to apply said prescribed excitation voltage between said first reference potential terminal and that one of said one of said first and second conductive lines to which a relatively high voltage side of said line-powering voltage is applied.

20. A ground fault detection and power control system according to claim 19, wherein said ground fault sensor includes an electro-optic control device coupled in circuit with said line power supply for controlling the operation thereof.

21. A ground fault detection and power control system according to claim 19, further including a short circuit clamp, which is controllably placed across said first and second conductive lines by said ground fault sensor, in response to said current through auxiliary conductive path exceeding said prescribed threshold.

22. A ground fault detection and power control system according to claim 19, further including a latching short circuit clamp, which is controllably latched across said first and second conductive lines by said ground fault sensor, in response to said current through auxiliary conductive path exceeding said prescribed threshold.

23. A method of protecting service personnel from an electrical hazard resulting from a ground fault condition of a conductive link which is employed for transporting communication signals and supplying power sourced from a link power supply to one or more communication circuits comprising the steps of:

(a) in response to said service personnel forming a ground fault between a ground reference and said conductive link, supplying loop current, from an excitation source separate from said link power supply, through a portion of said conductive link that includes said ground fault; and (b) in response to said loop current exceeding a prescribed threshold, protecting said service personnel from an electrical hazard by rapidly reducing the power supplied by said link power supply to said conductive link.

24. A method according to claim 23, wherein said portion of said conductive link includes a first impedance, and wherein step (b) comprises monitoring current flow through said first impedance being in excess of said prescribed threshold and, in response to said current exceeding said prescribed threshold, rapidly reducing power to said conductive link.

25. A method according to claim 23, wherein said excitation source is a DC voltage source.

26. A method according to claim 25, wherein said excitation voltage is coupled between one of first and second conductive lines of said conductive link and a ground reference potential terminal.

27. A method according to claim 26, wherein said excitation voltage is coupled between said ground reference potential terminal and that one of said one of said first and second conductive lines to which a relatively high voltage side of said link power supply is applied.

28. A method according to claim 23, wherein step (b) comprises rapidly reducing power supplied by said link power supply by means of a signal path containing an electro-optic control device.

29. A method according to claim 23, wherein step (b) comprises placing a short circuit clamp condition across first and second conductive lines of said conductive link, in response to said loop current exceeding said prescribed threshold.

30. A method according to claim 29, wherein step (b) comprises latching a short circuit clamp condition across said first and second conductive lines, in response to said loop current exceeding said prescribed threshold.

* * * * *